United States Patent
Sodagar

(10) Patent No.: US 11,012,723 B2
(45) Date of Patent: May 18, 2021

(54) SERVICE DESCRIPTIONS FOR MULTIMEDIA STREAMING

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/727,487

(22) Filed: Dec. 26, 2019

(65) Prior Publication Data

US 2020/0213638 A1 Jul. 2, 2020

Related U.S. Application Data

(60) Provisional application No. 62/704,042, filed on Jan. 2, 2019.

(51) Int. Cl.
| | | |
|---|---|---|
| *G06F 15/173* | (2006.01) | |
| *H04N 21/235* | (2011.01) | |
| *H04L 29/06* | (2006.01) | |
| *H04N 21/278* | (2011.01) | |
| *H04N 21/83* | (2011.01) | |
| *H04N 21/24* | (2011.01) | |

(52) U.S. Cl.
CPC ......... *H04N 21/2353* (2013.01); *H04L 65/80* (2013.01); *H04N 21/2402* (2013.01); *H04N 21/278* (2013.01); *H04N 21/83* (2013.01)

(58) Field of Classification Search
CPC ............. H04N 21/2353; H04N 21/278; H04N 21/83; H04N 21/2402; H04L 65/80
See application file for complete search history.

(56) References Cited

U.S. PATENT DOCUMENTS

| | | | | |
|---|---|---|---|---|
| 6,763,392 | B1* | 7/2004 | del Val | H04L 47/724 709/231 |
| 8,015,294 | B2* | 9/2011 | Bugenhagen | H04L 12/1403 709/227 |
| 10,880,349 | B2* | 12/2020 | Reznik | H04L 65/602 |
| 2008/0192752 | A1* | 8/2008 | Hyslop | H04W 74/06 370/395.21 |
| 2008/0212591 | A1* | 9/2008 | Wu | H04L 47/724 370/395.21 |
| 2014/0019593 | A1* | 1/2014 | Reznik | H04N 21/8456 709/219 |

(Continued)

OTHER PUBLICATIONS

International Search Report in International Application No. PCT/US2019/068681, dated Mar. 10, 2020.

(Continued)

*Primary Examiner* — Thanh T Nguyen
(74) *Attorney, Agent, or Firm* — Sughrue Mion, PLLC

(57) ABSTRACT

A method and apparatus include receiving a moving pictures experts group (MPEG) dynamic adaptive streaming over hypertext transfer protocol (DASH) media presentation description (MPD) file that includes a range of media bandwidth values. A service descriptor is inserted in the MPEG-DASH MPD file that specifies a maximum bandwidth value of the range of media bandwidth values. The MPEG-DASH MPD file that includes the service descriptor is provided to a client device to permit the client device to limit a bandwidth usage of the client device in association with the multimedia streaming content.

20 Claims, 4 Drawing Sheets

(56) References Cited

U.S. PATENT DOCUMENTS

| | | |
|---|---|---|
| 2016/0373311 A1 | 12/2016 | Kumar et al. |
| 2018/0063595 A1 | 3/2018 | Lo et al. |
| 2018/0262731 A1 | 9/2018 | Oh et al. |
| 2020/0045323 A1* | 2/2020 | Hannuksela ....... H04N 21/8543 |
| 2020/0162371 A1* | 5/2020 | Musku .................... H04L 45/20 |

OTHER PUBLICATIONS

Written Opinion in International Application No. PCT/US2019/068681, dated Mar. 10, 2020.

* cited by examiner

SERVICE DESCRIPTIONS FOR MULTIMEDIA STREAMING

CROSS-REFERENCE TO RELATED APPLICATION

This application claims priority from U.S. Provisional Patent Application No. 62/704,042, filed on Jan. 2, 2019, in the U.S. Patent and Trademark Office, the disclosure of which is incorporated herein by reference in its entirety.

BACKGROUND

Service Description is a tool to announce the desired operating points by a service provider to media clients. In the context of media streaming, moving pictures experts group (MPEG) has recently adopted a service description element to include service description in MPEG dynamic adaptive streaming over hypertext transfer protocol media presentation description (MPEG-DASH MPD) files.

The service description is described by the following document: W18057: Text of ISO/IEC 23009-1:2014 DAM 5 on device information and other extensions. In this draft, the general concept of service description, the service description element and two specific service descriptors are outlined.

The described latency descriptor allows multiple latency/quality pair sets. However, the current design does not have any definition for the quality and how those values are related with each other. Additionally, when service operators deploy services, depending on the network conditions and the number of concurrent clients, they may want to prescribe a different operating range to a client or group of clients, which might be impractical with the current design.

SUMMARY

According to an aspect of the disclosure, a method for providing multimedia streaming content includes receiving, by a network device and from a content provider device, a moving pictures experts group (MPEG) dynamic adaptive streaming over hypertext transfer protocol (DASH) media presentation description (MPD) file that includes a range of media bandwidth values; inserting, by the network device, a service descriptor in the MPEG-DASH MPD file that specifies a maximum bandwidth value of the range of media bandwidth values; and providing, by the network device and to a client device, the MPEG-DASH MPD file that includes the service descriptor to permit the client device to limit a bandwidth usage of the client device in association with the multimedia streaming content.

According to an aspect of the disclosure, a device for providing multimedia streaming content includes at least one memory configured to store program code; at least one processor configured to read the program code and operate as instructed by the program code, the program code may include receiving code configured to cause the at least one processor to receive, from a content provider device, a moving pictures experts group (MPEG) dynamic adaptive streaming over hypertext transfer protocol (DASH) media presentation description (MPD) file that includes a range of media bandwidth values; inserting code configured to cause the at least one processor to insert a service descriptor in the MPEG-DASH MPD file that specifies a maximum bandwidth value of the range of media bandwidth values; and providing code configured to cause the at least one processor to provide, to a client device, the MPEG-DASH MPD file that includes the service descriptor to permit the client device to limit a bandwidth usage of the client device in association with the multimedia streaming content.

According to an aspect of the disclosure, a non-transitory computer-readable medium may store instructions including one or more instructions that, when executed by one or more processors of a device for providing multimedia streaming content, cause the one or more processors to receive, from a content provider device, a moving pictures experts group (MPEG) dynamic adaptive streaming over hypertext transfer protocol (DASH) media presentation description (MPD) file that includes a range of media bandwidth values; insert a service descriptor in the MPEG-DASH MPD file that specifies a maximum bandwidth value of the range of media bandwidth values; and provide, to a client device, the MPEG-DASH MPD file that includes the service descriptor to permit the client device to limit a bandwidth usage of the client device in association with the multimedia streaming content.

DETAILED DESCRIPTION

Figure 1:
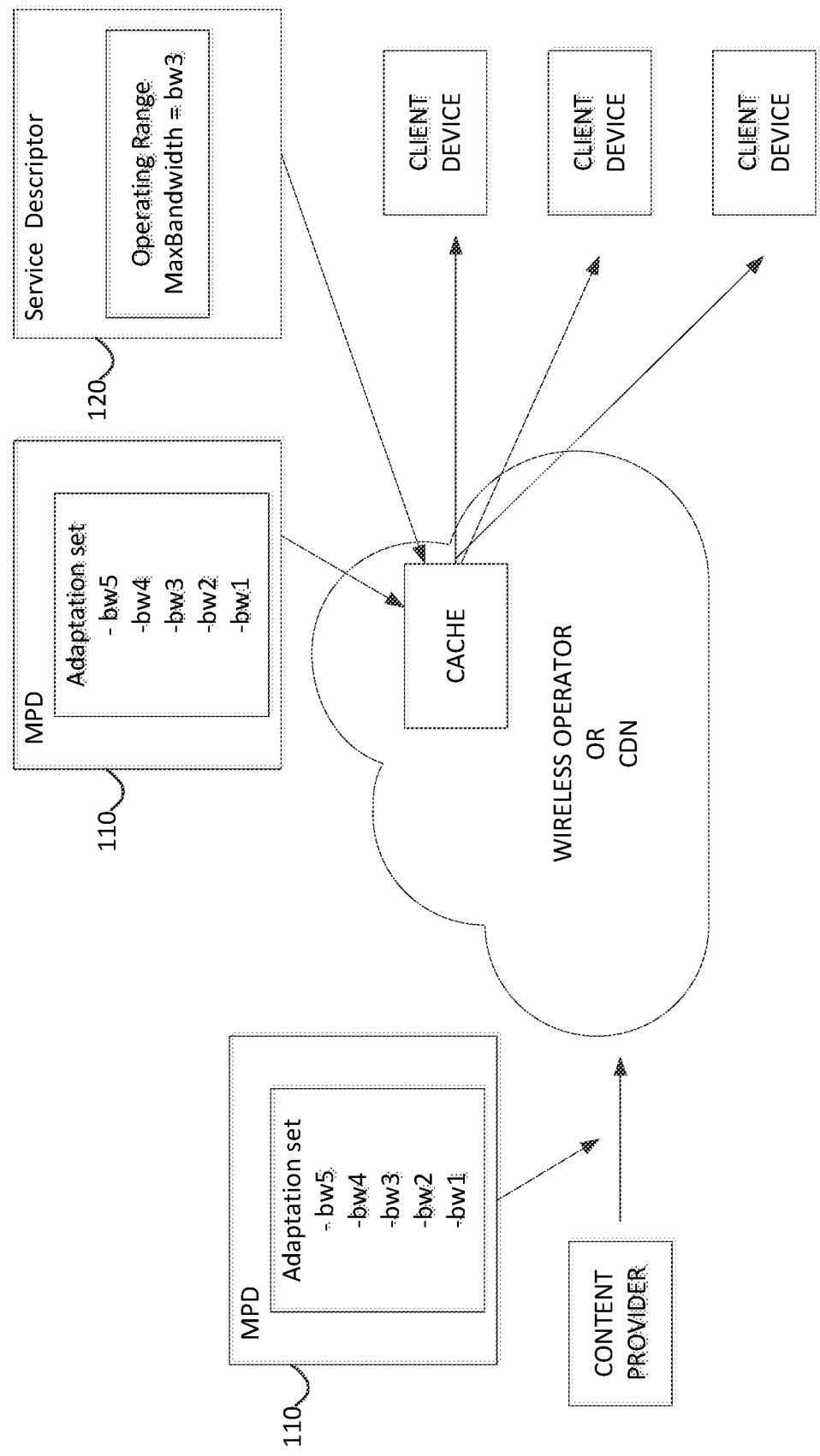
FIG. 1 is a diagram of an example overview of an embodiment described herein.

The present disclosure provides an improved latency descriptor, and introduces a new descriptor for a desired operating range for MPEG-DASH MPD files ("MPD files"). For example, a device may receive, from a content provider device, a moving pictures experts group (MPEG) dynamic adaptive streaming over hypertext transfer protocol (DASH) media presentation description (MPD) file that includes a range of media bandwidth values. Further, the device may insert a service descriptor in the MPEG-DASH MPD file that specifies a maximum bandwidth value of the range of media bandwidth values. Further still, the device may provide, to a client device, the MPEG-DASH MPD file that includes the service descriptor to permit the client device to limit a bandwidth usage of the client device in association with the multimedia streaming content.

According to an embodiment, an MPD file includes an improved service latency descriptor. The MPD file may include a "LatencyType" key. The "LatencyType" key may be an integer. Further, the "LatencyType" key may defines the type of the latency measured as a difference of an anchor and the time a sample is presented. For example, a value of "1" may indicate the latency target compared to the capture time as provided by the producer reference time. Further, a value of "2" may indicate the latency target compared to the capture time as provided by the producer reference time. Further, a value of "3" may indicate the latency target compared to the nominal segment availability time excluding (not corrected by the availability time offset). Further, a value of "4" may indicate the latency target compared to the segment availability time excluding (corrected by the availability time offset).

According to an embodiment, the MPD file may include a "TargetLatency" key. The "TargetLatency" key may be an integer. Further, the "TargetLatency" key may indicate the target latency for the service in milliseconds.

According to an embodiment, the MPD file may include a "MaximumLatency" key. The "MaximumLatency" key may be an integer. The "MaximumLatency" key may indicate the maximum latency for the service in milliseconds.

According to an embodiment, the MPD file may include a "MinimumLatency" key. The "MinimumLatency" key may be an integer. Further, the "MinimumLatency" key may indicate the minimum latency for the service in milliseconds.

According to an embodiment, the MPD file may include a "Latency" key. The "Latency" key may be an integer. Further, the "Latency" key may indicate a latency value for the service in milliseconds.

According to an embodiment, the MPD file may include a "quality" key. The "quality" key may be an integer. Further, the "quality" key may indicate that quality of the service at a latency value according to the "Latency" key. As an example, the "quality" key may indicate a value of the quality of the service at the above latency with "0" being the lowest and "100" being the highest.

According to an embodiment, the MPD file may include a "schemeIDUri" key. The "schemeIDUri" may be a string. The "schemeIDUri" may specify the scheme that defines the quality values. For example, the "schemeIdUri" key may define the scheme used for the quality values and how they related with each other. The "schemeIdUri" key may define a physical interpretation of the values (e.g., peak signal-to-noise ratio (PSNR), structural similarity indix (SSIM) metrics, etc.), or may define the relationship function between the numerical values (e.g. linear, log, etc.).

According to an embodiment, an MPD file may include a new service descriptor for signaling a desired operating point. For example, the present disclosure provides a descriptor to signal the minimum desired quality and/or the maximum desired bandwidth to a client. This descriptor is useful, among other scenarios, when the operating range may change on a client to client basis, depending on the current network condition, a service operator wants to recommend the range of the operation, or the like. Using this service descriptor, the operating range can be recommended to a client/group of clients (e.g., in a wireless cell), without changing the MPD for a client or a group of clients.

According to an embodiment, the MPD file may include a descriptor that defines the service description for minimum desired quality and maximum bandwidth.

According to an embodiment, the MPD file may include a "MediaType" key. The "MediaType" key may be a string. The "MediaType" key may defines the media type for which the playback applies, such as "video" (e.g., applies to video), "audio" (e.g., applies to audio), "any" (e.g., applies to any media type), or the like.

According to an embodiment, the MPD file may include a "MinQualityRanking" key. The "MinQualityRanking" may be an integer. The "MinQualityRanking" key may indicate a minimum quality ranking value for the above "MediaType" key. The "MinQualityRanking" key may indicate the smallest desired "@qualityRanking" value of the representations to be played by the DASH client.

According to an embodiment, the MPD file may include a "MaxBandwidth" key. The "MaxBandwidth" key may be an integer. The "MaxBandwidth" key may be an integer. The "MaxBandwidth" key may indicate the maximum bandwidth value desired for the above "MediaType" key. The "MaxBandwidth" key may be the largest "@bandwidth" value of the representations to be played by the DASH client.

FIG. 1 is a diagram of an example overview of an embodiment. For example, FIG. 1 shows a use-case example of the above operating point service descriptor. As shown in FIG. 1, the content provider may publish a single MPD file 110 for a program for its entire base of customers. The MPD file 110 may include video bandwidth from "bw1" to "bw5," where "bw5" is the highest (e.g., "bw1"<"bw2"<"bw3"<"bw4"<"bw5").

However, a group of clients may access the content via a wireless service operator or a content delivery network (CDN). Assume that the number of customers is higher than usual for that wireless operator/CDN. In this case, the wireless service operator/CDN might not be capable of providing the maximum bandwidth (e.g., "bw5") to all customers accessing the content through one of its base station/caches. Therefore, the wireless operator/CDN may insert a service descriptor 120 (e.g., as part of the MPD, or as a separate document), defining "MaxBandwidth" to be "bw3" for those customers. In this case, the clients that receive the MPD files defining "MaxBandwidth" to be "bw3" may limit the bandwidth usage to "bw3."

Figure 2:
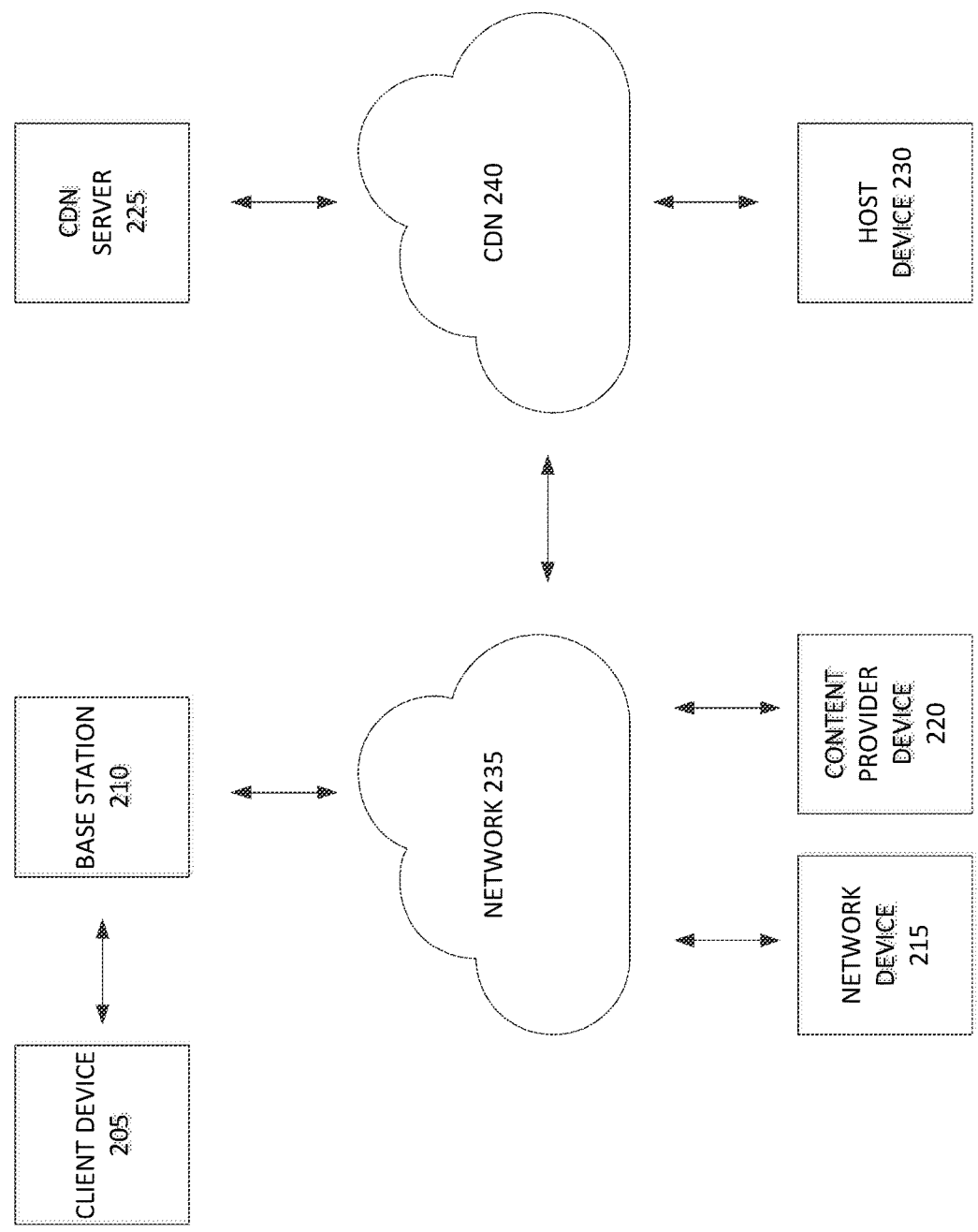
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 205, a base station 210, a network device 215, a content provider device 220, a CDN server 225, a host device 230, a network 235, and a CDN 240. Devices of environment 200 may interconnect via wired connections, wireless connections, or a combination of wired and wireless connections.

Client device 205 may include one or more devices capable of receiving, generating, storing, processing, and/or providing information associated with streaming media content. For example, client device 205 may include a communication and computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a set-top box, or a similar type of device.

Client device 205 may request streaming media content by requesting segments of the media stream (e.g., using HyperText Transfer Protocol (HTTP) Live Streaming (HLS), Dynamic Adaptive Streaming over HTTP (DASH), HTTP Dynamic Streaming, HTTP Adaptive Streaming, Microsoft Smooth Streaming, or the like). According to an embodiment, the request may be transmitted to host device 230. Host device 230 may respond to the request by providing the requested segments to client device 205, and client device 205 may process the received segments for playback.

Base station 210 may include one or more devices capable of transferring streaming media traffic, such as audio, video, and/or other traffic, destined for and/or received from client device 205. According to an embodiment, base station 210 may include an evolved Node B (eNB) associated with a long term evolution (LTE) network. Additionally, or alternatively, base station 210 may be associated with a radio access network (RAN) that is not associated with an LTE network. Base station 210 may send traffic to and/or receive traffic from client device 205 via an air interface. According to an embodiment, base station 210 may include a small cell base station, such as a base station of a microcell, a picocell, and/or a femtocell.

Network device 215 may include one or more devices capable of receiving, processing, storing, and/or transferring traffic associated with network 235. For example, network device 215 may include a server, a gateway, a firewall, a router, or a similar device. According to an embodiment, network device 215 may be included in network 235. According to an embodiment, network device 215 may be included in base station 210.

As used herein, traffic may refer to communication (e.g., via a packet) between two or more devices of environment 200. As used herein, a packet may refer to a communication structure for communicating information, such as a protocol data unit (PDU), a packet, a frame, a datagram, a segment, a message, a block, a cell, a frame, a subframe, a slot, a symbol, a portion of any of the above, and/or another type of formatted or unformatted unit of data capable of being transmitted via a network.

Content provider device 220 may include one or more devices capable of receiving, processing, storing, and/or providing information associated with streaming media content. For example, content provider device 220 may include a computing device, such as a server (e.g., an application server, a host server, a web server, an HTTP server, etc.), a network device, or a similar device.

CDN server 225 may include one or more devices capable of receiving, storing, processing, and/or providing information associated with streaming media content. For example, CDN server 225 may include a computing device, such as a server device or a similar device.

Host device 230 may include one or more devices capable of receiving, storing, processing, and/or providing streaming media content (e.g., one or more segments of streaming media content). For example, host device 230 may include a storage device, a server, or a similar device. Host device 230 may receive, from client device 205, requests for segments of the streaming media content. If a requested segment is stored by host device 230, then host device 230 may provide the requested segment to client device 205. If the requested segment is not stored by host device 230, then host device 230 may obtain the segment from content provider device 220 (e.g., by requesting and receiving the segment), may store the segment, and may provide the segment to client device 205.

Network 235 may include one or more wired and/or wireless networks. For example, network 235 may include a cellular network (e.g., an LTE network, a third generation (3G) network, a code division multiple access (CDMA) network, etc.), a public land mobile network (PLMN), a wireless local area network (e.g., a Wi-Fi network, etc.), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

CDN 240 may include one or more wired and/or wireless networks of devices that are capable of receiving, storing, processing, and/or providing streaming media content (e.g., one or more segments of the streaming media content). CDN 240 may include, for example, servers, data centers, or the like. According to an embodiment, CDN 240 may include host devices 245 and/or CDN server 225. One or more devices of CDN 240 may receive, from content provider device 220, streaming media content (e.g., one or more segments of a media stream) and may provide the streaming media content to client device 205.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
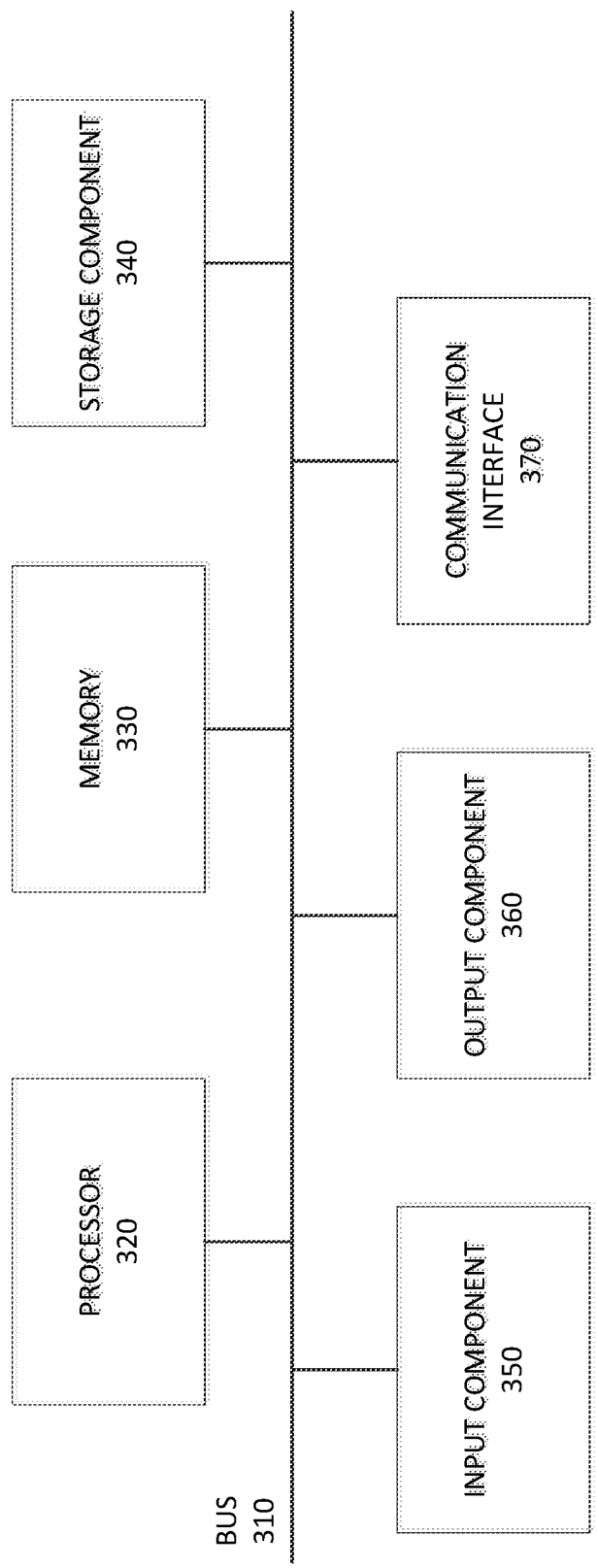
FIG. 3 is a diagram of example components of one or more devices of FIG. 2.

FIG. 3 is a diagram of example components of a device 300. Device 300 may correspond to client device 205, base station 210, network device 215, content provider device 220, CDN server 225, host device 230. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
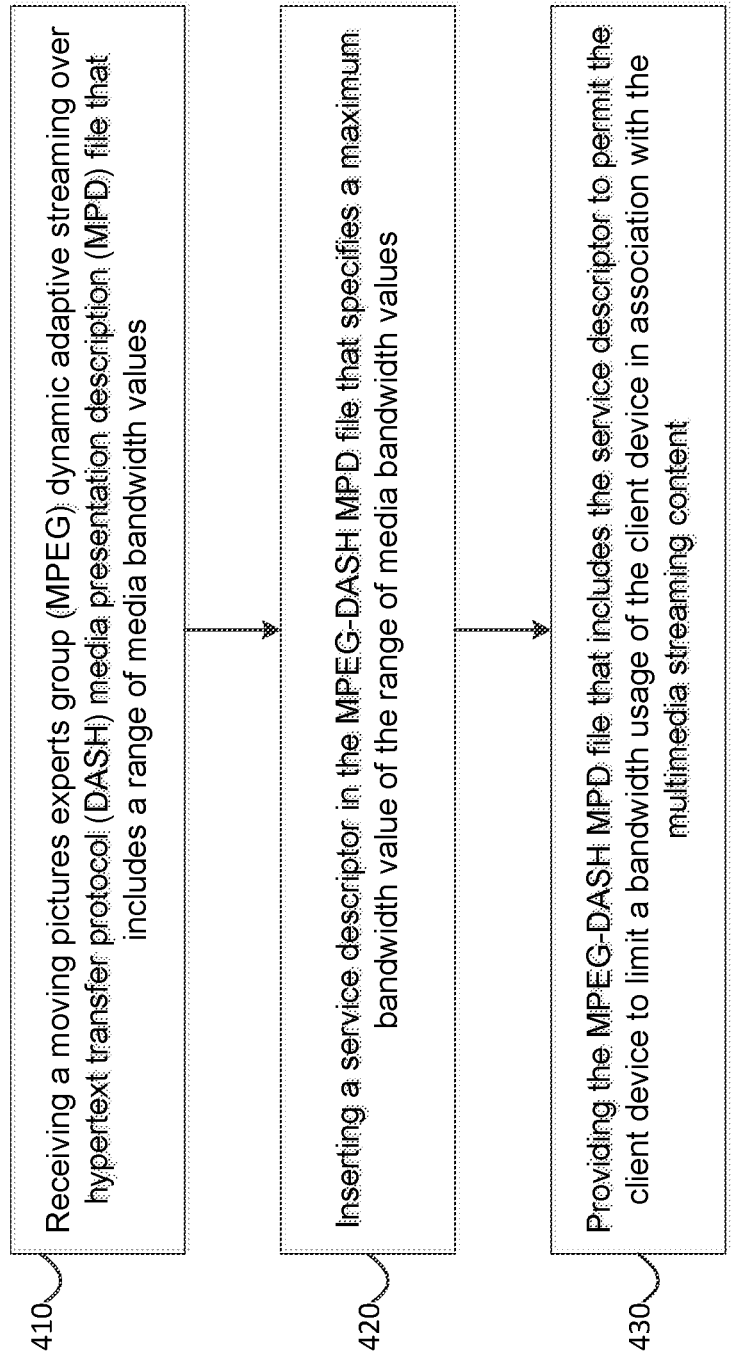
FIG. 4 is a flow chart of an example process for providing streaming media content described herein.

FIG. 4 is a flow chart of an example process 400 according to an aspect of the disclosure.

According to an embodiment, one or more process blocks of FIG. 4 may be performed by network device 215. According to an embodiment, one or more process blocks of FIG. 4 may be performed by another device or a group of devices separate from or including network device 215, such as client device 205, base station 210, network device 215, content provider device 220, CDN server 225, host device 230.

As shown in FIG. 4, process 400 may include receiving, by a network device and from a content provider device, a moving pictures experts group (MPEG) dynamic adaptive streaming over hypertext transfer protocol (DASH) media presentation description (MPD) file that includes a range of media bandwidth values (block 410).

As further shown in FIG. 4, process 400 may include inserting, by the network device, a service descriptor in the MPEG-DASH MPD file that specifies a maximum bandwidth value of the range of media bandwidth values (block 420).

As further shown in FIG. 4, process 400 may include providing, by the network device and to a client device, the MPEG-DASH MPD file that includes the service descriptor to permit the client device to limit a bandwidth usage of the client device in association with the multimedia streaming content (block 430).

Although FIG. 4 shows example blocks of process 400, according to an embodiment, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method for providing multimedia streaming content, comprising:

receiving, by a network device and from a content provider device, a moving pictures experts group (MPEG) dynamic adaptive streaming over hypertext transfer protocol (DASH) media presentation description (MPD) file that includes a range of media bandwidth values;

inserting, by the network device, a service descriptor in the MPEG-DASH MPD file that specifies a maximum bandwidth value of the range of media bandwidth values; and providing, by the network device and to a client device, the MPEG-DASH MPD file that includes the service descriptor to permit the client device to limit a bandwidth usage of the client device in association with the multimedia streaming content.

2. The method of claim 1, further comprising:

receiving, by the network device, information that identifies a particular client device to which to provide the MPEG-DASH MPD file including the service descriptor; and providing the MPEG-DASH MPD file based on the information that identifies the particular client device.

3. The method of claim 1, further comprising:
receiving, by the network device, information that identifies a cell having client devices to which to provide the MPEG-DASH MPD file including the service descriptor; and
providing the MPEG-DASH MPD file based on the information that identifies the cell.

4. The method of claim 1, further comprising:
receiving, by the network device, information that identifies a group of client devices to which to provide the MPEG-DASH MPD file including the service descriptor; and
providing the MPEG-DASH MPD file based on the information that identifies the group of client devices.

5. The method of claim 1, further comprising:
inserting, by the network device, a latency descriptor into the MPEG-DASH MPD file that specifies a latency value for the multimedia streaming content.

6. The method of claim 5, further comprising:
inserting, by the network device, a quality descriptor into the MPEG-DASH MPD file that specifies a quality of service (QoS) value at the latency value for the multimedia streaming content.

7. The method of claim 6, further comprising:
inserting, by the network device, a scheme descriptor that specifies a relationship between the latency descriptor and the quality descriptor.

8. A device for providing multimedia streaming content, comprising:
at least one memory configured to store program code; and
at least one processor configured to read the program code and operate as instructed by the program code, the program code including:
receiving code configured to cause the at least one processor to receive, from a content provider device, a moving pictures experts group (MPEG) dynamic adaptive streaming over hypertext transfer protocol (DASH) media presentation description (MPD) file that includes a range of media bandwidth values;
inserting code configured to cause the at least one processor to insert a service descriptor in the MPEG-DASH MPD file that specifies a maximum bandwidth value of the range of media bandwidth values; and
providing code configured to cause the at least one processor to provide, to a client device, the MPEG-DASH MPD file that includes the service descriptor to permit the client device to limit a bandwidth usage of the client device in association with the multimedia streaming content.

9. The device of claim 8, further comprising:
second receiving code configured to cause the at least one processor to receive information that identifies a particular client device to which to provide the MPEG-DASH MPD file including the service descriptor; and
wherein the providing code is configured to cause the at least one processor to provide the MPEG-DASH MPD file based on the information that identifies the particular client device.

10. The device of claim 8, further comprising:
second receiving code configured to cause the at least one processor to receive information that identifies a cell having client devices to which to provide the MPEG-DASH MPD file including the service descriptor; and
providing code configured to cause the at least one processor to provide the MPEG-DASH MPD file based on the information that identifies the cell.

11. The device of claim 8, further comprising:
second receiving code configured to cause the at least one processor to receive information that identifies a group of client devices to which to provide the MPEG-DASH MPD file including the service descriptor; and
wherein the providing code is configured to cause the at least one processor to provide the MPEG-DASH MPD file based on the information that identifies the group of client devices.

12. The device of claim 8, wherein the inserting code is configured to cause the at least one processor to insert a latency descriptor into the MPEG-DASH MPD file that specifies a latency value for the multimedia streaming content.

13. The device of claim 12, wherein the inserting code is configured to cause the at least one processor to insert a quality descriptor into the MPEG-DASH MPD file that specifies a quality of service (QoS) value at the latency value for the multimedia streaming content.

14. The device of claim 13, wherein the inserting code is configured to cause the at least one processor to insert a scheme descriptor that specifies a relationship between the latency descriptor and the quality descriptor.

15. A non-transitory computer-readable medium storing instructions, the instructions comprising: one or more instructions that, when executed by one or more processors of a device for providing multimedia streaming content, cause the one or more processors to:
receive, from a content provider device, a moving pictures experts group (MPEG) dynamic adaptive streaming over hypertext transfer protocol (DASH) media presentation description (MPD) file that includes a range of media bandwidth values;
insert a service descriptor in the MPEG-DASH MPD file that specifies a maximum bandwidth value of the range of media bandwidth values; and
provide, to a client device, the MPEG-DASH MPD file that includes the service descriptor to permit the client device to limit a bandwidth usage of the client device in association with the multimedia streaming content.

16. The non-transitory computer-readable medium of claim 15, wherein the one or more instructions cause the one or more processors to:
receive information that identifies a particular client device to which to provide the MPEG-DASH MPD file including the service descriptor; and
provide the MPEG-DASH MPD file based on the information that identifies the particular client device.

17. The non-transitory computer-readable medium of claim 15, wherein the one or more instructions cause the one or more processors to:
receive information that identifies a cell having client devices to which to provide the MPEG-DASH MPD file including the service descriptor; and
provide the MPEG-DASH MPD file based on the information that identifies the cell.

18. The non-transitory computer-readable medium of claim 15, wherein the one or more instructions cause the one or more processors to:
receive information that identifies a group of client devices to which to provide the MPEG-DASH MPD file including the service descriptor; and
provide the MPEG-DASH MPD file based on the information that identifies the group of client devices.

19. The non-transitory computer-readable medium of claim 15, wherein the one or more instructions cause the one or more processors to:
- insert a latency descriptor into the MPEG-DASH MPD file that specifies a latency value for the multimedia streaming content.

20. The non-transitory computer-readable medium of claim 19, wherein the one or more instructions cause the one or more processors to:
- insert a quality descriptor into the MPEG-DASH MPD file that specifies a quality of service (QoS) value at the latency value for the multimedia streaming content.

* * * * *